No. 886,408. PATENTED MAY 5, 1908.
F. H. RICHARDS.
FEED FOR AUTOMATIC MACHINES.
APPLICATION FILED SEPT. 29, 1902.

Witnesses
Herbert J. Smith
C. A. Jarvis

Inventor
F. H. Richards

No. 886,408. PATENTED MAY 5, 1908.
F. H. RICHARDS.
FEED FOR AUTOMATIC MACHINES.
APPLICATION FILED SEPT. 29, 1902.

Witnesses.
Herbert J. Smith
C. A. Jarvis.

Inventor:
F. H. Richards,

Fig. 10.

A-Cam ⅞" Feed.
B-Cam ½" Feed.

No. 886,408. PATENTED MAY 5, 1908.
F. H. RICHARDS.
FEED FOR AUTOMATIC MACHINES.
APPLICATION FILED SEPT. 29, 1902.

UNITED STATES PATENT OFFICE.

FRANCIS H. RICHARDS, OF HARTFORD, CONNECTICUT.

FEED FOR AUTOMATIC MACHINES.

No. 886,408.    Specification of Letters Patent.    Patented May 5, 1908.

Application filed September 29, 1902. Serial No. 125,167.

*To all whom it may concern:*

Be it known that I, FRANCIS H. RICHARDS, a citizen of the United States, residing at Hartford, in the county of Hartford and State of Connecticut, have invented certain new and useful Improvements in Feeds for Automatic Machines, of which the following is a specification.

This invention pertains to stock-feeding apparatus designed to coöperate with automatic machinery, and more particularly relates to an intermittent feed and its connection and coöperation with an automatic machine having intermittently operating instrumentalities.

This invention consists in an intermittent feed in which a feed roll is constantly rotated in a forward direction through the medium of a driving connection the parts of which are relatively shiftable, and is carried by mechanism operatively connected with the driving mechanism of said roll forward and backward to alternately augment and detract from the feeding action of said roll and effect an intermittent feed of stock engaged by said roll and also consists in the organization and coöperative disposition and arrangements of the parts and in the peculiarly effective structure of the parts, together with means for regulating and adjusting said parts to attain perfect action and to obtain any desired movement of feed.

The invention also consists in a novel organization of the feeding mechanism with that of an automatic machine to produce positive co-action between the feed and the operating instrumentalities.

Some of the objects of this invention are to provide a practical operatively, continuously and positively connected intermittent feed mechanism capable of positive coöperation with an intermittently operating automatic machine, and to provide improved mechanism comprising such a device in which the several correlated parts are more effectually organized.

I have illustrated in the accompanying drawings one form of feed mechanism embodying my invention, in combination with a carving machine in which reciprocating cutters coöperate during a portion of each cycle of the machine to form ornamental characters upon molded stock or the like, but I desire to point out that my device may also be embodied in and combined with other intermittently operative machines intended for the same or other purposes.

In the drawings like reference characters designate like parts throughout the several views.

Referring to the drawings, the entire mechanism is shown mounted in and on the box-like frame A, the intermittently operating machine being mounted in and on a main part B of the frame A, and the feed mechanism in an ell C of the frame A. A horizontal driving shaft 2 is mounted longitudinally of the frame A in bearings 3 and 4 in the end walls of the frame A. Two eccentrics 5 and 6 are mounted fast upon the driving shaft 2 within the main part B of the frame A.

A stock guide 7 is formed in and longitudinally of the top of the frame A. A tool-carriage 8 is mounted to reciprocate in vertical guideways 9, 9, upstanding from the top of the frame A adjacent to the stock guide 7, and said tool-carriage 8 extends downwardly through an aperture in the top of the frame A to within the main part B, said aperture being alined with the guideways 9, 9. That portion of the tool-carriage extending downwardly within the main part B of the frame A is connected by means of an eccentric rod 10 with the eccentric 6 upon the driving shaft 2.

A tool-carriage 11 is mounted in horizontal guideways 12, 12 in the top of the main part B of the frame A, and is provided with depending vertical guideways 13 which extend downwardly through an aperture in said top and within the main part B of the frame A. A horizontal shaft 14 is mounted longitudinally of the machine and parallelly with the driving shaft 2, in bearings 15 and 16 in the walls of the main part B of the frame A. The shaft 14 is mounted below what would be approximately the center of the path of travel of the tool-carriage 11. A rocking lever 17 is mounted fast upon the shaft 14 in substantially a vertical position and is bifurcated at its upper end to accommodate a slide block 18 which is pivoted within the bifurcated portion of the arm 17. The slide block 18 is mounted within the guideways 13 depending from the tool-carriage 11 and is adapted to slide vertically therein. The lower end of the lever 17 is also bifurcated and an eccentric rod 19 pivoted in said bifurcated portion connects the lower end of the lever 17 with the eccentric 5 upon the driving shaft 2. The eccentric 6 operating directly upon the tool-carriage 8 reciprocates the same in a vertical path. The eccentric 5 through the eccentric rod 19 rocks the lever 17, which rocking movement is communicated through the yoke connection made by the slide block 18 in the guideway 13 to the tool-carriage 11 reciprocating said tool-carriage horizontally and transversely of the machine. The eccentrics 5 and 6 are set in such a position and the connecting mechanism is so organized that the reciprocations of the two tool-carriages 8 and 11 are simultaneous and tools 20 mounted upon said tool-carriages in a suitable manner operate to incise stock lying in the stock guide 7 simultaneously. The respective sets of the tools 20 are staggering one relative to another and therefore their cutting edges do not meet. The respective sets of the tools 20 simultaneously incise complementary incisions of separate repeats of the design upon the stock and that part of the cycle of the machine during which the said tools 20 are within the profile of the stock either when making the incision or being withdrawn occupies a fraction of the time employed in completing said cycle.

To complete the effective operation of such a machine as I have described it is necessary that the stock, indicated by 7', be fed intermittently to the tools during that period in the cycle of the machine when the tools are entirely without the profile of the stock, and it is also necessary that the amount of feed be substantially uniform and exact. To effect this feed and to time it so as to coöperate with the operation of the tools it is necessary that a positive coöperation should exist between the driving mechanism of the carving machine proper and that of the feeding mechanism.

Upon the driving shaft 2 within the ell of the frame A is mounted fast a spiral gear 21. A horizontal shaft 22 is mounted at right angles to and above the driving shaft in a bearing 23 in the side wall of the ell of the frame and a bearing 24 projecting from the end wall of the ell C of the frame A. A spiral gear 25 is mounted fast upon the shaft 22 and meshes with the spiral gear 21 upon the driving shaft 2 transmitting the rotation of the driving shaft 2 to the shaft 22 at the ratio of 1 to 1. A spur gear 26 is also mounted fast on shaft 22 and meshes with a spur gear 27 mounted loosely on a stud 28 projecting from the side wall of the ell C of the frame A. The spur gear 27 acting as a crank carries a wrist pin 29.

A comparatively long rocking frame 30 is pivoted at its lower end by means of a horizontal shaft 31 mounted transversely of the ell C of the frame A in bearings 32 and 33 in the side walls of the ell C of the frame A, and is adapted to oscillate in a plane parallel to the stock guide 7. At the upper end of the rock frame 30 a horizontal shaft 34 is mounted transversely of the stock guide 7 and carries a fast feed roll 35 the periphery of which feed roll extends upwardly through an aperture in the stock guide 7 and slightly above the floor of said stock guide.

An aperture in the left side wall of the ell C of the frame A closed by a door 36 is provided to give access to the feed mechanism, and hereafter that part of the feed mechanism toward the operator and said aperture will be considered the front of said feed mechanism.

The shaft 34 projects forwardly of the rocking frame 30 and upon said projecting portion a change gear 37 is removably mounted. A horizontal shaft 38 is mounted in the rocking frame 30 below and parallel to the shaft 34 and upon its rearwardly-projecting end is mounted fast a crank 39 carrying a wrist pin 40. The wrist pin 40 on the crank 39 is connected with the wrist pin 29 on the spur gear 27 by a link 41, and it will be seen that the rotation of the driving shaft 2 will be transmitted to the gearing described and to the shaft 38 upon the rocking frame 30 through the link 41. The shaft 38 projects forwardly of the rocking frame 30, and a change gear 42, meshing with the gear 37, is removably secured thereon.

The driving connection consisting of the crank 39, the spur gear 27 acting as a crank, and the link connecting these permits of the oscillation of the rocking frame 30 within certain limits without materially interfering with the operativeness of said connection, but when such movement is imparted to the rocking frame 30 a variable velocity will be imparted to the feed roll carried by said rocking frame 30.

In the first instance, it may be considered that I set the rocking frame 30 in such a position that the shaft 38 thereon and the stud 28 upon the frame A will be disalined, which therefore will cause the rotation of the feed roll 35 by the driving shaft 2 at varying velocities. It is now possible to rock the rocking frame 30 backward of the machine at velocities which will produce a change in the velocities imparted to the feed roll of such a nature that said feed roll would be rolled back upon stock lying at rest and in contact with its periphery without causing a movement of said stock with relation to the machine as an entirety. This I accomplish by mounting a change cam 43 removably upon a forwardly-projecting portion of the shaft 22 and so conforming a portion of its periphery that an idle roll 44 mounted upon a shaft 45 journaled on the rocking frame 30 when made to roll upon said cam will impart the required motion to the rocking frame 30 and effect the desired result. When the rocking frame 30 is rocked forwardly of the machine the rotation of the feed roll 35 from the driving shaft 2 will continue, and augmented by the forward movement of the rocking frame 30 effect a quick feed of the stock. The cam 43 is conformed to also effect this forward movement of the rocking frame 30, and it is well to state here that I time the oscillation of the rocking frame 30 with the variable movement attained through the crank-and-link connection in such a manner that the cam 43 will approximate a circular form, which is of course desirable.

The mechanism of the feed is timed to cause the rolling back of the feed roll and the consequent stoppage of the stock during that portion of the cycle of the machine in which the tools are entirely without the profile of the stock.

The higher points upon the cam 43 force the rocking frame 30 forward, and I have found that the peculiar connections used and the tendency of the feed roll in contact with the stock is to return the rocking frame 30 without further aiding means, but I have employed a spring 46 to insure a contact of the idle roll 44 with the cam 43.

The rocking of the rocking frame 30 effects a movement of the periphery of the feed roll in an arc, but the angular movement of said frame 30 is, in the construction illustrated, so slight that said movement in an arc is not obvious nor hurtful.

By substituting for the change gears 37 and 42 and the cam 43 other change gears of different ratio and their corresponding cam different lengths of feed may be attained.

Figure 1:
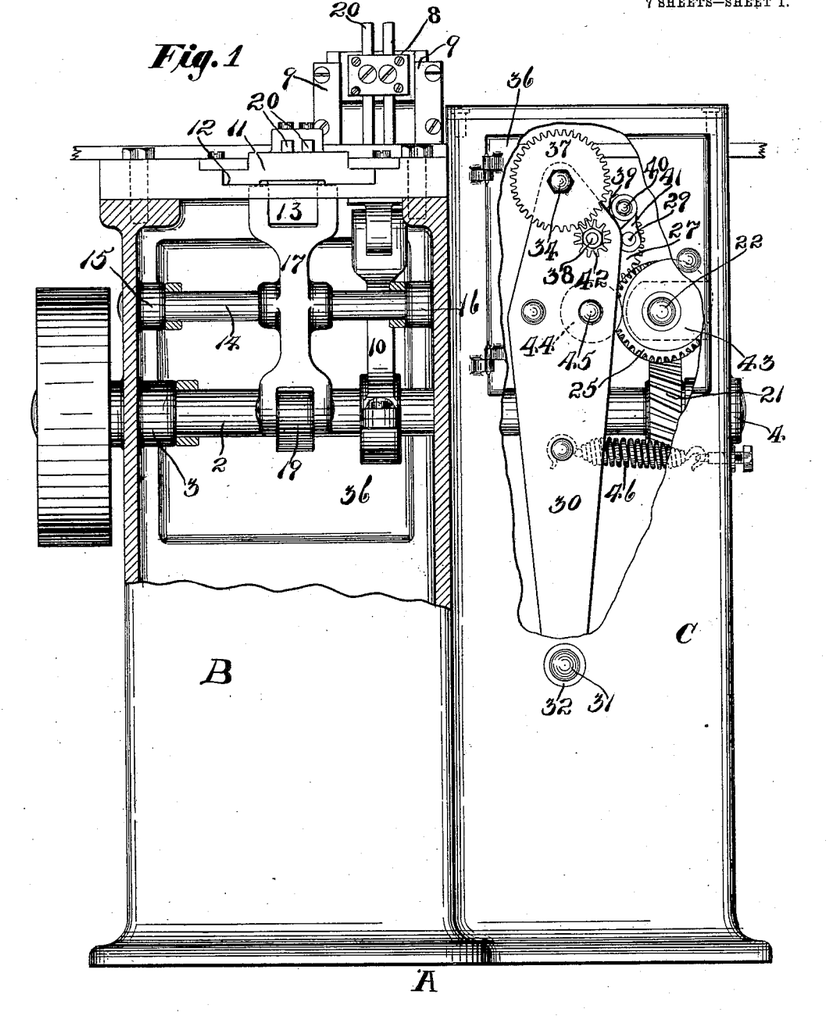
Figure 1 is a left-side view of a carving machine and feed mechanism embodying my invention with portions of the walls of the frame broken away showing the inclosed mechanisms.
Figure 2:
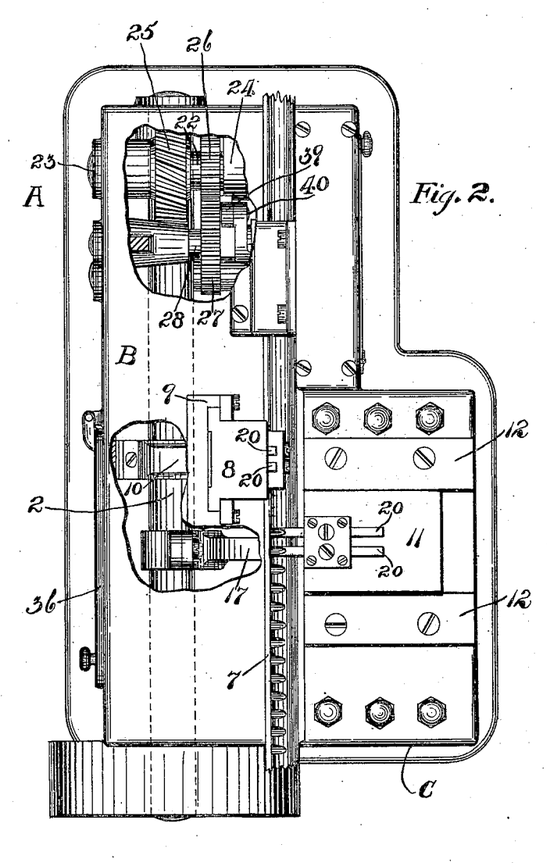
Fig. 2, a plan view with portions of the top of the frame being broken away showing inclosed mechanisms.
Figure 3:
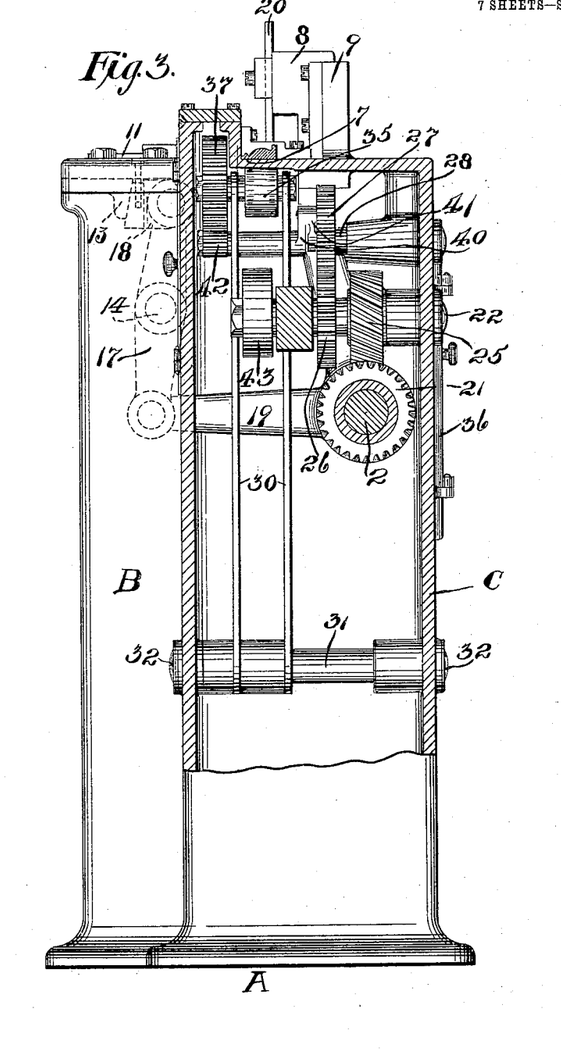
Fig. 3, a vertical section, looking from the front of the machine.
Figure 4:
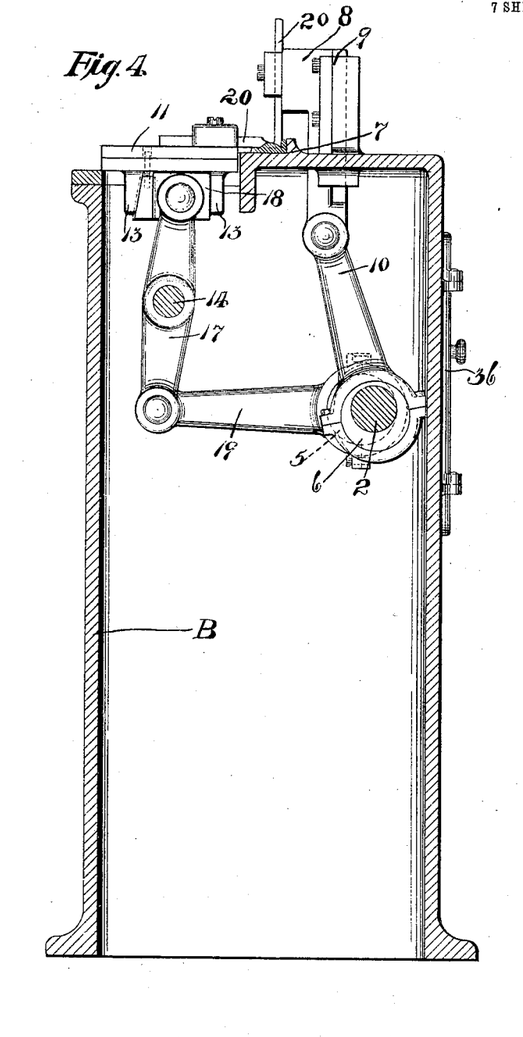
Fig. 4, a vertical cross-section.
Figure 5:
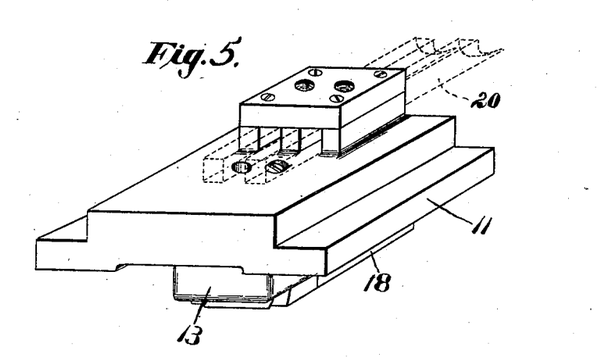
Fig. 5, a detail in perspective of the horizontal tool-carriage of the carving machine shown.
Figures 6, 7, 8, 9:
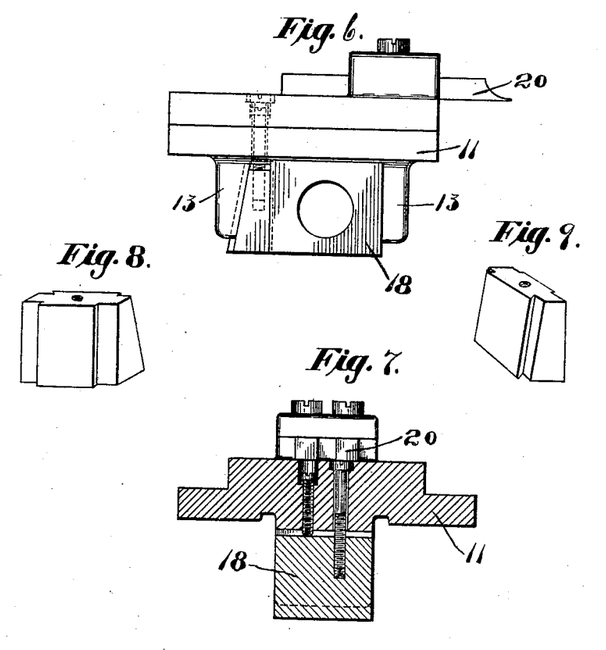
Fig. 6, a side view of the same.
Fig. 7, a vertical cross-section of the same.
Figs. 8 and 9, two perspective views of the wedge gib of the tool-carriage illustrated in Fig. 5.
Figure 10:
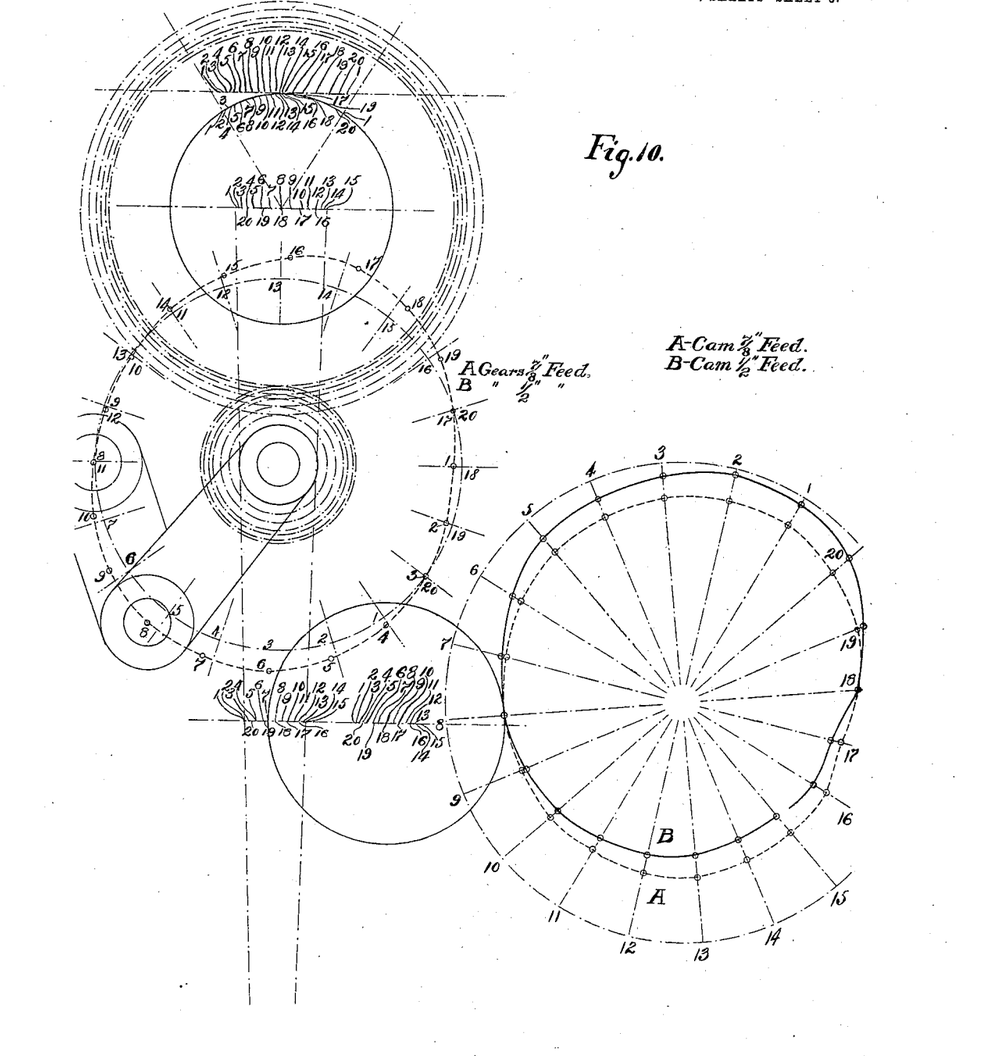
Fig. 10, a diagrammatic representation of the movement of the several parts of the feed device indicating by numerals "1" to "20", twenty successive positions of the several parts at twenty successive moments separated by equal periods in a single rotation of the driver.
Figure 11:
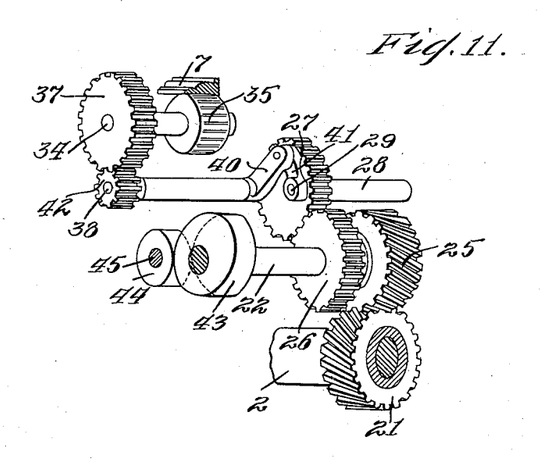
Fig. 11 is a diagrammatic view in perspective of the gear mechanism for driving the feed roll.

The diagram on Fig. 10 indicates how the feed movement takes place along certain lines and the various movements of some of the parts are indicated by numerals from 1 to 20 inclusive, which will show how the parts move in producing the feed and the cessation of feed. The full line perimeter B of the cam 43 indicates the development of the cam for one length of feed movement, and the dotted line perimeter A of this cam indicates a development for a longer feed movement.

The organizing of the parts and construction in such manner as to bring the change gears and change cam within easy access is most desirable. Presser means for insuring a grip upon the stock 7' by the feed roll 35 will be of some suitable form, but that which I have illustrated is a bridge over the stock and conforming to the face of the stock directly above the feed roll.

It is obvious that various changes in details and construction may be made for the purpose of adapting mechanism to different classes of work and environment and in combining the same with machines of various characters without departing from the spirit of my invention.

Having described my invention, I claim—

1. In an automatically fed machine, the combination of a stationary support, a stock guide mounted upon said support and a driving shaft mounted in said support, of instrumentalities operatively connected with said driving shaft to intermittently operate in proximity to said stock guide, a carrier mounted on said support to move forward and backward in the general direction of said stock guide, a roll rotatably mounted upon said carrier with its periphery in proximity to said stock guide, a yielding driving connection between said driving shaft and said roll, and means independent of said yielding driving connection operatively connecting said carrier with said driving shaft all organized to effect a backward movement of said carrier concurrently with the proximity of said instrumentalities to said stock guide during which backward movement of said carrier velocities are developed at the point of contact of said roll with its tangential path equivalent to the concurrent peripheral velocities of said roll.

2. In an automatically fed machine, the combination with a stationary support and the driving shaft mounted in said support, of a crank mounted for rotation in said support and driven from said driving shaft, a carrier mounted for a forward and backward movement on said support, a roll rotatably mounted on and carried by said carrier, a second crank mounted for rotation on said carrier, a link connecting said first and second cranks, change gears forming a driving connection between said second crank and said roll, and change means operatively connecting said driving shaft and said carrier to effect a forward and backward movement of said carrier.

3. In an automatically fed machine, the combination with a stationary support and the driving shaft mounted in said support, of a crank mounted for rotation in said support and driven from said driving shaft, a carrier mounted for a forward and backward movement on said support, a roll rotatably mounted on and carried by said carrier, a second crank mounted for rotation on said carrier, a link connecting said first and second cranks, change gears forming a driving connection between said second crank and said roll, and a change cam operatively connecting said driving shaft and said carrier to effect a forward and backward movement of said carrier.

4. In an automatically fed machine, the combination with a stationary support and the driving shaft mounted in said support, of a crank mounted for rotation in said support and driven from said driving shaft with its axis of rotation transverse of that of said driving shaft, a carrier mounted on said support for a forward and backward movement substantially parallelly of said driving shaft, a roll rotatably mounted on and carried by said carrier with its plane of rotation parallel to the path of movement of said carrier, a second crank mounted for rotation on said carrier with its axis of rotation parallel to that of said roll, a link connecting said first and second cranks, change gears forming a driving connection between said second crank and said roll, and change means operatively connecting said driving shaft and said carrier to effect a forward and backward movement of said carrier.

5. In an automatically fed machine, the combination with a stationary support and the driving shaft mounted in said support, of a crank mounted for rotation in said support and driven from said driving shaft, a carrier mounted for a forward and backward movement on said support, a roll rotatably mounted on and carried by said carrier, a second crank mounted for rotation on said carrier, a link connecting said first and second cranks, change gears forming a driving connection between said second crank and said roll, and change means operatively connecting said driving shaft and said carrier to effect a forward and backward movement of said carrier sufficiently limited to permit at all times the complete rotation of said second crank by said first crank.

6. In an automatically fed machine, the combination with a stationary support and the driving shaft mounted in said support, of a crank mounted for rotation in said support and driven from said driving shaft, a carrier mounted for a forward and backward movement on said support, a roll rotatably mounted on and carried by said carrier, a second crank mounted for rotation on said carrier, a link connecting said first and second cranks, change gears forming a driving connection between said second crank and said roll, and change cam means operatively connecting said driving shaft and said carrier to effect a forward and backward movement of said carrier.

7. In an automatically fed machine, the combination with a stationary support and a driving shaft mounted in said support, of a crank mounted for rotation in said support and driven from said driving shaft, a carrier mounted for a forward and backward movement on said support, a roll rotatably mounted on and carried by said carrier, a second crank mounted for rotation on said carrier, a link connecting said first and second cranks, change gears forming a driving connection between said second crank and said roll, a change cam driven from said driving shaft operatively connected with said carrier to effect a movement in one direction and controlling the movement in the other direction of said carrier, and a spring connecting said carrier and said support tending to move said carrier in said latter direction.

8. In an automatically fed machine, the combination with a stationary support and the driving shaft mounted in said support, of a carrier pivoted on said support at a point other than that occupied by the axis of said driving shaft to oscillate upon said support, a roll rotatably mounted upon said carrier, a laterally yielding driving connection between said driving shaft and said roll, change gears in said connection between said driving shaft and said roll, and a change cam driven from said driving shaft operatively engaging said carrier to effect an oscillation of said carrier.

9. In an automatically fed machine, the combination of a driving shaft, a crank driven thereby, a reciprocatory carrier, a rotary roll thereon, a crank mounted on the carrier, a link connecting said cranks, change gears forming a driving connection between the roll and the crank on the carrier, and a change cam operatively connecting said driving shaft and said carrier for effecting the reciprocation thereof.

FRANCIS H. RICHARDS.

Witnesses:
MARCUS C. HOPKINS,
JOHN O. SEIFERT.